United States Patent
Kuo et al.

(10) Patent No.: US 9,098,163 B2
(45) Date of Patent: Aug. 4, 2015

(54) INTERNET TV MODULE FOR ENABLING PRESENTATION AND NAVIGATION OF NON-NATIVE USER INTERFACE ON TV HAVING NATIVE USER INTERFACE USING EITHER TV REMOTE CONTROL OR MODULE REMOTE CONTROL

(75) Inventors: Jenke Wu Kuo, San Diego, CA (US); Aravind Babu Asam, San Diego, CA (US); Tanmay Agnihotri, San Diego, CA (US)

(73) Assignee: Sony Corporation, Tokyo (JP)

( * ) Notice: Subject to any disclaimer, the term of this patent is extended or adjusted under 35 U.S.C. 154(b) by 376 days.

(21) Appl. No.: 13/604,930

(22) Filed: Sep. 6, 2012

(65) Prior Publication Data

US 2014/0022461 A1   Jan. 23, 2014

Related U.S. Application Data

(60) Provisional application No. 61/674,147, filed on Jul. 20, 2012.

(51) Int. Cl.
| | |
|---|---|
| *G06F 3/0481* | (2013.01) |
| *H04N 5/44* | (2011.01) |
| *H04N 5/445* | (2011.01) |
| *H04N 21/436* | (2011.01) |
| *H04N 21/4363* | (2011.01) |
| *H04N 21/482* | (2011.01) |
| *H04N 21/81* | (2011.01) |

(52) U.S. Cl.
CPC ............ *G06F 3/0481* (2013.01); *H04N 5/4403* (2013.01); *H04N 5/44543* (2013.01); *H04N 21/43615* (2013.01); *H04N 21/43635* (2013.01); *H04N 21/482* (2013.01); *H04N 21/8153* (2013.01); *H04N 2005/4433* (2013.01); *H04N 2005/44565* (2013.01)

(58) Field of Classification Search
CPC .................................................... H04N 5/4403
USPC .................................................. 715/719, 740
See application file for complete search history.

(56) References Cited

U.S. PATENT DOCUMENTS

| | | | |
|---|---|---|---|
| 7,634,787 B1 | 12/2009 | Gebhardt et al. | |
| 7,996,869 B2 | 8/2011 | Tu et al. | |
| 2003/0229900 A1 | 12/2003 | Reisman | |
| 2007/0101288 A1 | 5/2007 | Forstall et al. | |
| 2009/0201420 A1* | 8/2009 | Brown et al. | 348/552 |
| 2010/0162118 A1* | 6/2010 | Kim et al. | 715/716 |
| 2010/0194998 A1* | 8/2010 | Lee et al. | 348/726 |
| 2010/0262938 A1* | 10/2010 | Woods et al. | 715/850 |
| 2010/0263006 A1 | 10/2010 | Matsuyama | |
| 2010/0269152 A1* | 10/2010 | Pahlavan et al. | 726/3 |
| 2011/0047572 A1* | 2/2011 | Hill et al. | 725/41 |
| 2011/0063524 A1* | 3/2011 | Yee et al. | 348/739 |
| 2011/0149158 A1 | 6/2011 | Cooper et al. | |

(Continued)

*Primary Examiner* — Omar Abdul-Ali
(74) *Attorney, Agent, or Firm* — John L. Rogitz; John M. Rogitz

(57) ABSTRACT

A display device receive icon or application information from an audio visual application module (AVAM) and presents, on the native UI of the display, a selectable AVAM icon according to the information from the AVAM. The AVAM icon is associated with an application on the AVAM. Display input is automatically switched to the AVAM responsive to selection of the icon from the native UI using the display RC, at which point a non-native UI received from AVAM is presented for navigation using the display RC. Input commands are relayed to the AVAM.

29 Claims, 9 Drawing Sheets

(56) References Cited

U.S. PATENT DOCUMENTS

| | | |
|---|---|---|
| 2011/0193857 A1 | 8/2011 | Filippov et al. |
| 2011/0219420 A1 | 9/2011 | Raveendran et al. |
| 2011/0314386 A1* | 12/2011 | Jeong et al. ............... 715/741 |
| 2012/0054794 A1* | 3/2012 | Kim et al. ............... 725/38 |
| 2012/0060114 A1* | 3/2012 | Chung et al. ............... 715/800 |
| 2012/0233559 A1* | 9/2012 | Seo ............... 715/760 |
| 2012/0249890 A1* | 10/2012 | Chardon et al. ............... 348/734 |

* cited by examiner

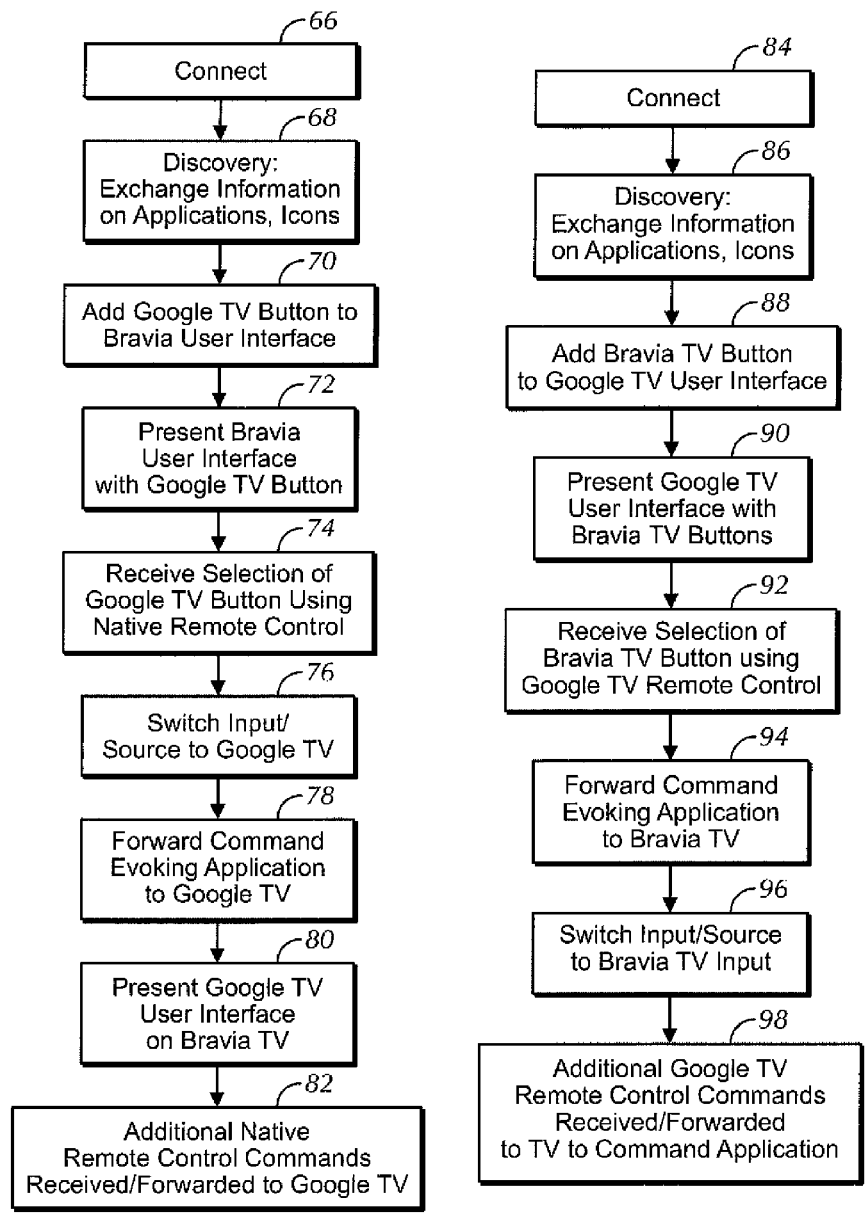

INTERNET TV MODULE FOR ENABLING PRESENTATION AND NAVIGATION OF NON-NATIVE USER INTERFACE ON TV HAVING NATIVE USER INTERFACE USING EITHER TV REMOTE CONTROL OR MODULE REMOTE CONTROL

FIELD OF THE INVENTION

The present application relates generally to Internet TV modules for enabling presentation and navigation of non-native user interfaces (UI) on TVs that have native user interfaces.

BACKGROUND OF THE INVENTION

Modern TVs such as the Sony Bravia (trademark) present native user interfaces (UI) to allow viewers to select an audio video (AV) input source, to launch non-broadcast TV applications such as video telephone applications (e.g., Skype), and so on. As understood herein, many viewers of TVs may prefer to access application-based UIs, with which many viewers may be as or more familiar than they are with native TV UIs, and which increase a viewer's range of choices by allowing a user to view application-based content such as Internet video.

As further recognized herein, a legacy display device such as TV may not be programmed with a non-native UI, and furthermore non-native UIs can change rapidly so a TV programmed with an application-based UI, for example, may soon be presenting an obsolete UI. However, present principles understand that simply porting a non-native UI to a TV for presentation thereof may undesirably prevent the user from employing the TV remote control (RC), since absent present principles the TV would not know how to respond to RC commands input using a UI that the TV has no knowledge of.

SUMMARY OF THE INVENTION

Present principles understand that high definition multimedia interface (HDMI) and its attendant consumer electronics control (CEC) link may be exploited to implement a seamless user experience to list and launch applications in a non-native UI menu from an Internet TV module communicating with a display device such as a TV through HDMI input switching and if desired Internet Protocol (IP) connections. To share applications between the module and the TV, the TV may automatically switch its HDMI input to that of the module and launch applications on the module seamlessly to the user. Present principles provide a mechanism to share applications among devices without porting the applications to other platforms. Also with HDMI/CEC or IP connections, devices may share input events (e.g. from remote control or touch screen) among devices to achieve a unified and simple user experience without changing the input devices.

Accordingly, in one embodiment a display device includes at least one display and at least one processor controlling the display to present a native user interface (UI) on the display responsive to commands from a display remote control (RC). The display device also includes a computer readable storage medium accessible to the processor and bearing instructions executable by the processor to cause the processor to receive at least icon or application information from an audio visual application module (AVAM) and present, on the native UI, at least one selectable AVAM icon according to the information from the AVAM. The AVAM icon is associated with an application on the AVAM. The instructions also cause the processor to automatically switch the display input source to the AVAM responsive to selection of the icon from the native UI using the display RC, present on the display a non-native UI received from AVAM associated with the application, receive input commands from the display RC, and send the input commands to the AVAM. Furthermore, the instructions cause the processor to alter the non-native UI presented on the display responsive to signals from the AVAM that respond to the commands.

In some embodiments, the presentation of the non-native UI on the display is altered in response to an AVAM remote control associated with the AVAM providing input commands directly to the AVAM.

Additionally, if desired, the display device may provide at least native icon and/or application information associated with a selectable native icon to the AVAM to be presented on the non-native UI. Accordingly, responsive to selection of the native icon on the non-native UI, the processor may automatically switch the display input source to the display device and present on the display a native UI associated with the native icon.

Further, if desired, at least when the at least one AVAM icon is active, the processor may juxtapose the AVAM icon in an arrangement including at least one selectable native icon such that both the AVAM icon and the native icon are selectable from the arrangement using the display RC. Under such an arrangement, e.g., plural selectable AVAM icons may be presented on the native UI based at least in part on icon and/or application information that is received.

Also if desired, the display device processor may receive both icon and application information from the AVAM. Moreover, the at least icon or application information received from the AVAM may include command association data. Thus, upon selection of the icon from the native UI using the display RC, command association data associated with the icon may be sent to the AVAM to cause the AVAM to provide the non-native UI.

Furthermore, in some embodiments, the processor may not alter the non-native UI presented on the display upon receipt of input commands from the display RC. Instead, it may only pass on input commands from the display RC to the AVAM, which may subsequently alter the non-native UI only in response to signals from the AVAM where the AVAM then responds to the commands.

Additionally, the connection of the display device with the AVAM may include an HDMI connection, an IP connection, or both. In some implementations when an HDMI connection is used, HDMI input switching may be performed by the display device to automatically switch display input source to the AVAM.

Even further, it is to be understood that in some exemplary embodiments, the application itself may not necessarily be stored on the computer readable storage medium of the display device. Instead, icon and application information may be received from the AVAM but not the actual application.

In another embodiment, an audio video application module (AVAM) includes at least one AVAM processor configured to generate an application-based user interface (ABUI) and at least one communication port establishing communication between the Internet and the AVAM processor. The AVAM also includes at least one AV port configured to communicate with a display device having a processor presenting a native UI (NUI) on a display of the display device. The AVAM processor is configured to exchange at least icon or application information with the display device and, based on the information received from the display device, add to the ABUI at least one selector each representing respective applications on the display device. The processor is also configured to send the ABUI to the display device for presentation on the display based on user input to an AVAM remote control. In addition, the processor is configured to receive at least one command from the AVAM remote control, where the at least one command pertains to at least one application on the display device represented by the at least one selector on the ABUI. Even further, the processor is configured to send the at least one command to the display device for execution of the command by the display device.

In still another embodiment, a method includes receiving either or both icon information and application information from an audio video application module (AVAM) at a display device. The method also includes presenting on a native user interface (UI) of the display device at least one AVAM icon based on the information from the AVAM, where the at least one AVAM icon is selectable using a display remote control associated with the display device. The method then includes automatically switching a display input source to the AVAM responsive to selection of the icon using the display remote control and then presenting on the display device a non-native UI, another icon, and/or an application received from AVAM in response to selection of the icon using the display remote control. Thereafter, the method includes manipulating the non-native UI and/or application using a display remote control associated with the display device. The display device receives input from the display remote control to alter the non-native UI and/or application and communicates the input to the AVAM. Thus, the AVAM and not the display device is used to alter the non-native UI and/or application based on the input. Further, the display remote control is not pre-programmed to directly manipulate the non-native UI and/or application.

The details of the present invention, both as to its structure and operation, can be best understood in reference to the accompanying drawings, in which like reference numerals refer to like parts, and in which:

BRIEF DESCRIPTION OF THE DRAWINGS

FIG. 2 is a flow chart of example logic to be executed by the processor of a display device such as a TV in a home network in accordance with present principles;

FIG. 3 is a flow chart of example logic to be executed by the processor of an AVAM in a home network in accordance with present principles.

DETAILED DESCRIPTION OF THE PREFERRED EMBODIMENT

Figure 1:
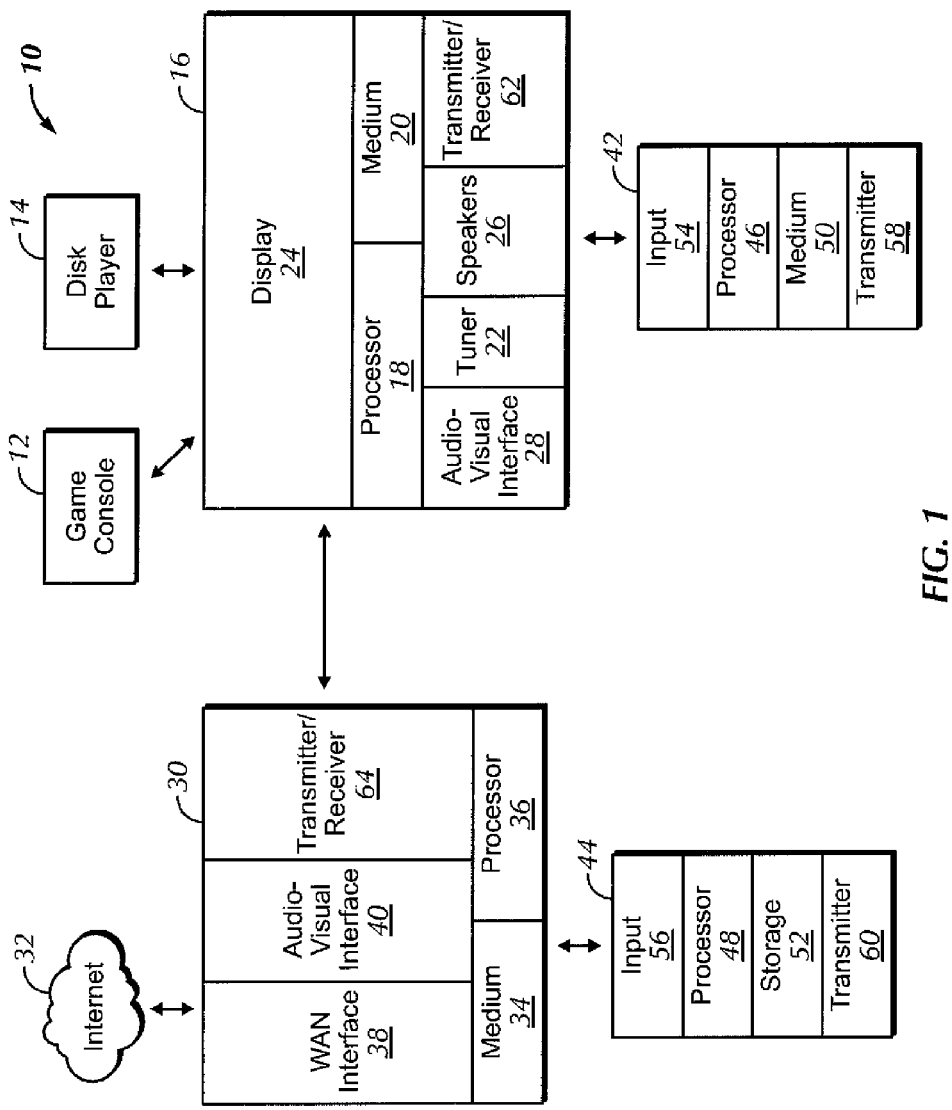
FIG. 1 is a block diagram of a non-limiting example system in accordance with present principles.

Referring initially to the exemplary embodiment shown in FIG. 1, a system generally designated 10 is shown. The system 10 includes a game console 12 and a disk player 14. The system 10 also includes a display device 16 that includes a processor 18, tangible computer readable storage medium 20 such as disk-based or solid state storage, a tuner 22, display 24, and speakers 26. In some embodiments, the display device 16 may be, but is not limited to, a television (TV) such as a Sony Bravia high-definition television manufactured by Sony Corporation. In some examples, the TV processor executes a Linux operating system to provide applications apart from TV channel presentation. It is to be understood that the display device 16 may present on the display 24 and/or speakers 26 its own user interface (UI), referred to herein as a "native" UI under control of the processor 18.

The device 16 also includes an audio-visual (A/V) interface 28 to communicate with other devices such as the game console 12 and disk player 14 in accordance with present principles. The A/V interface may be used, e.g., in a high definition multimedia interface (HDMI) context for communicating over an HDMI cable through an HDMI port on the display device 16 with, e.g., the game console 12. However, other A/V interface technologies may be used in lieu of or in conjunction with HDMI communication to implement/execute present principles, as may be appreciated by those within the art. For instance, e.g., cloud computing, IP networks, national electrical code (NEC) communication, coaxial communication, fiber optic communication, component video communication, video graphics array (VGA) communication, etc., may be used.

Still in reference to FIG. 1, an audio-video application module (AVAM) 30 is shown as being connected to the Internet 32. It is to be understood that the audio-video application module 30 includes a tangible computer readable storage medium 34 such as disk-based or solid state storage, as well as a processor 36, a network interface 38 such as a wired or wireless modem or router or other appropriate interface, e.g., a wireless telephony transceiver, and an audio-visual interface 40 that is configured to communicate with the audio-visual interface 28 of the display device 16 and, if desired, any other modules in the system 10 such as the game console 12 and display player 14 over, e.g., HDMI connections or any of the other connection types listed above. The VAM 30 may execute an operating system than that executed by the TV processor. For instance, in an example embodiment the AVAM 30 is a Google TV module executing the Android operating system.

Furthermore, it is to be understood that the processor 18 and processor 36, in addition to any other processors in the system 10 such as in the game console 12 and 14, are capable of executing all or part of the logic discussed herein as appropriate to undertake present principles. Moreover, software code implementing present logic executable by, e.g., the processors 18 and 36 may be stored on one of the memories shown (the computer readable storage mediums 20 and 34) to undertake present principles.

Continuing in reference to FIG. 1, a remote commander (RC) 42 associated with the display device 16 and referred to herein as the "native" RC is shown. An RC 44 associated with the AVAM 30 is also shown. The RCs 42 and 44 have respective processors 46 and 48, respective computer readable storage mediums 50 and 52, and respective one or more input devices 54 and 56 such as, but not limited to, touch screen displays, keypads, and/or voice recognition technology for receiving user commands. The RCs 42 and 44 also include respective transmitters/receivers 58 and 60 (referred to herein simply as transmitters 58 and 60 for convenience) for transmitting user commands under control of the respective processors 46 and 48 received through the input devices 54 and 56.

It is to be understood that the transmitters 58 and 60 may communicate not only with transmitters on their associated devices via wireless technology such as RF and/or infrared (i.e. the transmitter 58 under control of the processor 46 may communicate with a transmitter 62 on the display device 16 and the transmitter 60 under control of the processor 48 may communicate with a transmitter 64 on the AVAM 30), but may also communicate with the transmitters of other devices in some embodiments. The transmitters 58 and 60 may also receive signals from either or both the transmitter 62 on the display device 16 and transmitter 64 of the AVAM 30. Thus, it is to be understood that the transmitters/receivers 58 and 60 allow for bi-directional communication between the remote commanders 42 and 44 and respective display device 16 and AVAM 30.

Now in reference to FIG. 2, a flow chart of example logic to be executed by, e.g., the processor of a display device in a home network, such as the display device 16, for enabling presentation and navigation of a non-native user interface presented on a TV having a native user interface using either a TV remote control or a module remote control is shown. Beginning at block 66, a connection is made, established, and/or recognized between the TV and a module in a home network such as, but not limited to, a Google TV box over, e.g., an HDMI cable. The connection may be made, e.g., responsive to detecting a wired or wireless connection with an audio video application module (AVAM). Then at block 68, the logic executes discovery operations between the TV and module such as, but not limited to, polling each other and/or exchanging information to communicate in accordance with present principles, such as information regarding, e.g., applications and icons associated with the respective devices as well as icon/command association parameters such as those to be shortly described. However, it is to be understood that information may be sent only one way from the TV to the module and vice versa in some embodiments.

Then at block 70 the logic adds, e.g., a button associated with the module to a native user interface associated with the TV such as, by way of example, a Google TV button. It is to be understood that the native UI on which the button is added may or may not actually be presented on the TV's display at the moment the button is added, but if not presented at that moment, the UI will include the button the next time the UI is presented on the display.

Moving to block 72, the logic causes the native user interface to be presented on the display of the TV with one or more new icons/buttons (e.g., one or more icons/buttons associated with and/or from a UI associated with the Google TV module). Then at block 74 the logic receives selection of a button that was added to the native UI such as, e.g., a Google TV button, using a native RC of the TV. Receipt of a selection at block 74 then causes the TV source/input to switch the HDMI source connection/input to the module input (e.g., the Google TV module) at block 76, and to thus switch from the native UI used to select the Google TV button to a UI associated with the module (e.g., the Google TV UI). However, it is to be understood that in some embodiments a combined UI that "merges" the native UI and module UI may also/instead be presented in accordance with present principles.

Thereafter, at block 78, a command is forwarded by the logic from the TV to the module, e.g., the Google TV module, to invoke/start up the application or program associated with the selected button. Moving to block 80, the logic receives input from the module and presents on the TV display, e.g., a module UI and/or application associated with the selected program provided by the module.

Concluding FIG. 2 at block 82, one or more native RC commands (e.g., module UI navigation and/or application commands for the module application) may be received by the TV and forwarded to the module. However, please note that in accordance with present principles, the RC associated with the module may also be used to input commands directly to the module to manipulate the module UI/application. In other words, should a user input commands not through the native RC but through the module RC, the module receives the commands directly to be executed rather than receiving forwarded commands from the TV.

Regardless, present principles recognize that when the TV processor receives and forwards commands from the native RC to the module such as at, e.g., blocks 74 and 82, the native RC commands/input commands received through the native RC are then interpreted by the module processor based on CEC/HDMI commands, IP protocols, and/or certain icon/command association parameters/data established by the module when exchanging information at block 68. As an example, there may be three Google TV-associated applications added to the native UI at block 70. Each of the Google-TV associate applications is associated with a particular number.

Thus, the first Google TV application may be associated with "0," the second Google TV application may be associated with "1" and the third Google TV application may be associated with "3." The TV processor need not necessarily recognize that selection of the first Google TV application is to, e.g., invoke a Google Chrome search function per se, only that selection of the first Google TV application using the native RC causes the TV processor to forward a signal to the Google TV module including the "0," which the Google TV module then recognizes as a command to invoke the Google Chrome search function and present, e.g., a search box on the TV's display.

Put another way, the Google TV module recognizes a correlation with the "0" associated with the first Google TV application since it provided the number to the TV at block 68 when providing the Google Chrome search button (the first Google TV application to the TV to be presented on the native UI, which was then provided back to it in a signal from the TV processor when the native RC was used to select the module button presented on the TV display. Furthermore, note that still other icon/command association parameters, including more complex ones, may be established/used in accordance with present principles such that once a module application is invoked (e.g., the Google Chrome search function is invoked, causing the Google Chrome UI including a search box to be presented on the TV display), the native TV RC may be further used to, e.g., provide additional and/or more complex commands to further manipulate/command the module application (e.g., enter search parameters and select a "search" button in accordance with the principles set forth above). Also note that the module RC and its functions, which will be described shortly, may be similarly used to manipulate native TV functions.

Thus, it may be appreciated that in non-limiting embodiments, e.g., the TV does not alter a non-native UI presented on the TV upon receipt of input commands from a display/native RC. Instead, it passes/forwards input commands from the display RC to the module and the module subsequently alters the non-native UI presented on the TV only in response to signals it receives and responds thereto. Accordingly, present principles recognize that, e.g., the display remote control need not necessarily be pre-programmed to directly manipulate the non-native UI and/or application. The same is true in the opposite direction—that a non-native RC need not necessarily be pre-programmed, either.

Moving on to FIG. 3, a flow chart of example logic to be executed by the processor of an AVAM, such as a Google TV, in a home network in accordance with present principles is shown. Beginning at block 84, a connection is made, established, and/or recognized between the module and a TV in a home network over, e.g., an HDMI cable. The connection may be made, e.g., responsive to detecting a wired or wireless connection with a display device. Then, at block 86 the logic executes discovery operations between the module and a TV such as, but not limited to, polling each other and/or exchanging information to communicate in accordance with present principles, such as information regarding, e.g., applications and icons associated with the respective devices, as well as icon/command association parameters such as those described above. However, it is to be understood that information may be sent only one way from the display device to the module and vice versa, if desired.

Moving to block 88, the logic adds, e.g., a button/icon associated with a TV application to a module UI to be provided by the module and presented on the TV display. By way of example, a Sony Bravia button associated with a video conferencing application (e.g., Skype) may be added to a Google TV UI. It is to be understood that the module UI (e.g., Google TV UI) on which the native TV button is added may or may not actually be presented on the TV's display at the moment the button is added, but if not currently presented, the module UI includes the button the next time the UI is presented on the display. Either way, the module UI including the one or more TV-associated buttons is presented on the TV display at block 90.

Then at block 92 the logic receives selection of a TV button that was added to the module UI such as, e.g., a Bravia TV button, using a module RC. Receipt of a selection at block 92 then causes, at block 94, a command in accordance with present principles to be forwarded by the logic from the module to the TV such as, e.g., a Bravia TV, to thereby invoke/start up the TV application or program associated with the selected button. Accordingly, it is to be understood that, in accordance with present principles, invoking a TV application by manipulating a module RC to select the TV button on the module UI as set forth above causes the TV processor to display, e.g., the information, UIs, application, etc. associated with the selected button.

Continuing with reference to FIG. 3, at block 96 the logic may send a signal to the TV to switch the TV's source from the module input to a source associated with the TV, yet it is to be understood that communication is nonetheless maintained between the module and TV to undertake present principles. However, note that in other embodiments no source switch may be necessary to nonetheless allow the TV to present, e.g., the selected TV application and, e.g., cease presenting the module UI on the TV display. Thus, either the module processor may cause the source switch at block 94, no switch may be necessary, or in still other embodiments forwarding of the command invoking the TV application at block 94 causes the TV processor to switch source inputs.

Regardless, the logic concludes at block 98, where the logic receives one or more additional commands from the module RC and forwards the commands and/or other appropriate information to the TV to thereby manipulate the TV application or TV UI (if one is presented) in accordance with the icon/command association parameter principles set forth above or other commands methods disclosed herein. However, please note that in accordance with present principles, the TV RC may also be used to input commands directly to the TV to manipulate the TV UI/application. In other words, should a user input commands not through the module RC but through the native TV RC, the TV receives the commands directly to be executed rather than receiving forwarded commands from the module (e.g., the Google TV acting under control of a Google TV-associated RC).

It may now be appreciated that the application links/buttons/icons in devices can be "hard coded" with its menu or it can be dynamically downloaded from other devices or services through, e.g., HDMI/CEC and/or IP connection. In some cases, the devices may generate and exchange the application list and related icons and texts through HDMI/CEC, local IP protocol, or even cloud computing/services by pushing or pulling them. Then the device (e.g., a TV) connected to the application resident device may present application links/icons/buttons on its UI such that it synchronizes these available applications with the other connected devices (e.g., a Google TV box). From the user's perspective, the user just chooses the application links/icons/buttons shown on the TV. Then the application/device launches the selected application seamlessly by, e.g., switching HDMI inputs to show the screen for the application UI on the TV.

Put another way, to share applications among component devices and a display device (e.g., a TV), the display device may automatically switch the HDMI input with the selected application resident device. Furthermore, at the same time as the HDMI switching, the device (such as a TV) showing the application link should notify the other device (e.g., a component device) to launch the selected application. Present principles provide a way to share an application among devices without porting the applications to other platforms.

It is to be further appreciated that with HDMI/CEC or IP connection, devices may share the input events (e.g. from remote control or touch screen) among devices to achieve a unified and simple user experience without changing the input devices. The input events may be received in one device and passed through to other devices through either HDMI/CEC commands and/or IP protocols, and vice versa. Again, this provides a way to connect HDMI devices for a user experience to navigate multiple UI screens individually and seamlessly In addition, by the sharing application links/icons/buttons using this "other platform" concept, it also provides a way to engage the functionality of multiple applications across HDMI devices. For example, an EPG application from a tablet can be shown on a large screen TV, and the remote of the TV may thus navigate the EPG, and also the touch screen of a tablet may control the tuning on TV or STB box through the EPG UI application. As another example, a TV UI menu may show the links/icons/buttons (e.g., icon and/or texts) of applications on a Google TV box, and as user select the links/icons/buttons on the TV using the TV remote, the TV switches the HDMI input to the Google TV UI and launches the selected application. Navigating the application may then be done using the TV remote. Again, present principles recognize that many applications can "share" without extensively changing individual coding of the devices to thus apply the principles set forth herein to present, on a single UI, applications from different connected devices (e.g., by switching the HDMI inputs) using, e.g., IP protocol communication to present a seamless user experience.

Thus, from a user's perspective, application contents can show in any UI screen of a viewing A/V device and the user can activate these applications without worrying about switching remote controls. It provides s "one touch play" user experience among the, e.g., HDMI/CEC and IP connection devices. In other words, users may enjoy application contents seamlessly, even without knowing where the application resides (i.e. on which device it is stored and run from). This makes the user's experience and application execution appear unencumbered from dedicated platforms as these devices establish the HDMI/CEC and IP connections concurrently.

Furthermore, it is to be understood that individual platforms or devices may update or download their own applications without impacting the user's experience. Also, it can be easy to replace or add new HDMI devices having new or different applications by updating an application list to existing HDMI/IP connection platforms seamlessly to a user (e.g., every time a connection is made).

Put another way, applications may be, e.g., downloaded, updated, etc. in any one of the module devices (e.g., a tablet of Google TV module), and the application links/icons/buttons are thus uploaded to other devices or even a cloud service using present principles and thus can be used on compatible devices (e.g., share the applications link on other devices UI). Also, note that the application links/icons/buttons may be uploaded to any device UI using, e.g., a cross-cloud service to share the link with friend (e.g., using a social networking service, email, etc.) to launch the application with the same type device or a different but compatible device on the friend's end (i.e. their home network, etc.).

Specifically regarding the use of a cloud service, which in some embodiments may be an Internet cloud service, the service can be prompted to download application links/icons/buttons to desired devices to share the applications using present principles. Thus, the application may be implemented in one platform but can be launched through other platform UIs under service-oriented control for, e.g., recommendations and promotions for services/applications (e.g. Net Ad), or social network sharing and/or friend sharing in accordance with present principles (e.g., icon/command association parameters). Furthermore, the application link/button/icon list may also be uploaded to a cloud service or peer-to-peer communication environment to share the link/button/icon list with other HDMI-connected devices. Thus, it may be appreciated that it is convenient for a user may be "notified" as to applications that are available on other platforms and then launch the application(s) without changing the control of, e.g., the currently used input device (e.g., remote control, mouse, joystick, gesture technology, touch screen, tablet computer, etc.).

Even further, using present principles on multiple platforms, besides the "focus UI screen," a user may use other executing applications running in the background individually. Thus, a method is provided to group these platforms as a multi-processor system concept through, e.g., HDMI/CEC and IP network connection to enhance the home or personal network capability. In one embodiment, with a multiple HDMI screens platform (e.g. a PC with multiple monitors), these applications can be presented on multiple screens and multiple devices. Thus, a user can launch the application link in one PC monitor and show the applications on another PC monitor through "switching" for the applications (e.g. EPG on STB, or IPTV on network or tablet) on another monitor or TV.

Note that to enhance the device capability, not all devices necessarily need to have the IP connection, but at least one is preferred to have IP connection with the Internet and others through HDMI/CEC connections are preferred to communicate with each other in some non-limiting embodiments. Furthermore, with the "IP over HDMI protocol," the methods disclosed herein also provide an HDMI connection with network based-home and/or cloud network protocols such as DLNA or web applications.

It may also be appreciated that by employing present principles, application developers do not necessarily need to port an application to all devices and/or make an application compatible with all devices (e.g., an iTunes store application can be used on a device using an Android operating system).

In yet another implementation, note that an available application link list/menu of the devices can be presented as an application link so that a user can choose their preferred application link/icon/buttons and the device may send the preference application link/icon/button list to other devices to show as the application link/icon/button list on its UI menu as well. This is shown in FIG. 4.

Figure 4:
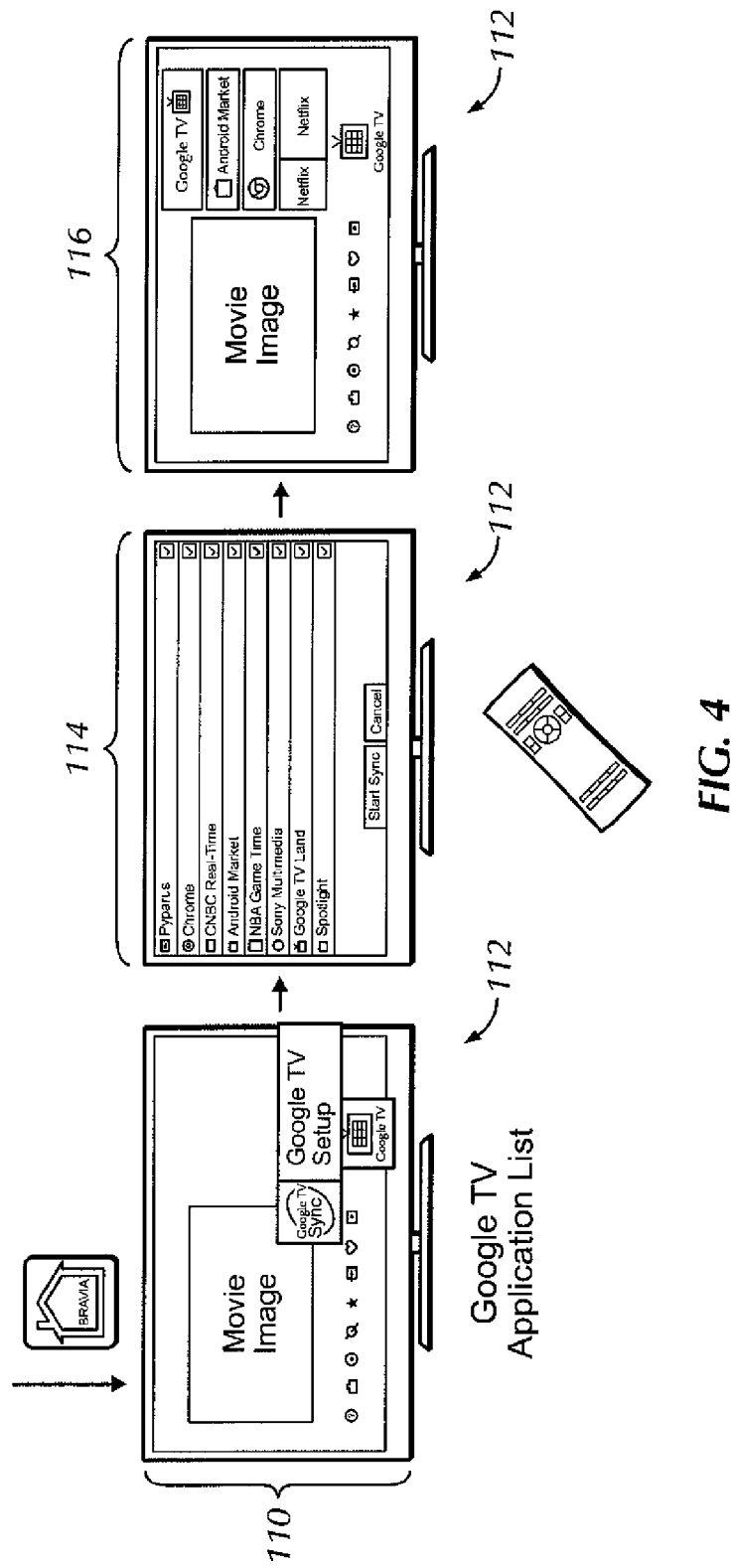
FIGS. 4-10 show exemplary implementations of present principles in the context of a Google TV module communicating with a Sony Bravia TV.

Thus, as shown in the exemplary embodiment of FIG. 4 employing present principles, e.g., two Google TV applications are initially shown (Google TV and Google TV Setup), on screen presentation 110 of Bravia TV 112. Then Google TV Setup is selected on the native UI (NUX), which launches a Google TV sync application, shown as screen presentation 114. A "sync" button can be selected therefrom, which may cause, e.g., screen presentation 116 to be presented, wherein the Google TV applications and icons are combined with the NUX. Note that as may be appreciated from both screen presentations 110 and 116, a "picture-in-picture" feature is shown in that Bravia TV and Google TV features/applications are shown on the same screen so that a user may continue watching a desired program while also navigating Google TV icons. Thus, it is to be appreciated that, in accordance with present principles, either a GTV UI or a Bravia TV UI may gather the information needed to employ the picture-in-picture feature, or the two UIs may be "merged" and/or "overlaid" to provide the picture-in-picture feature.

Figure 5:
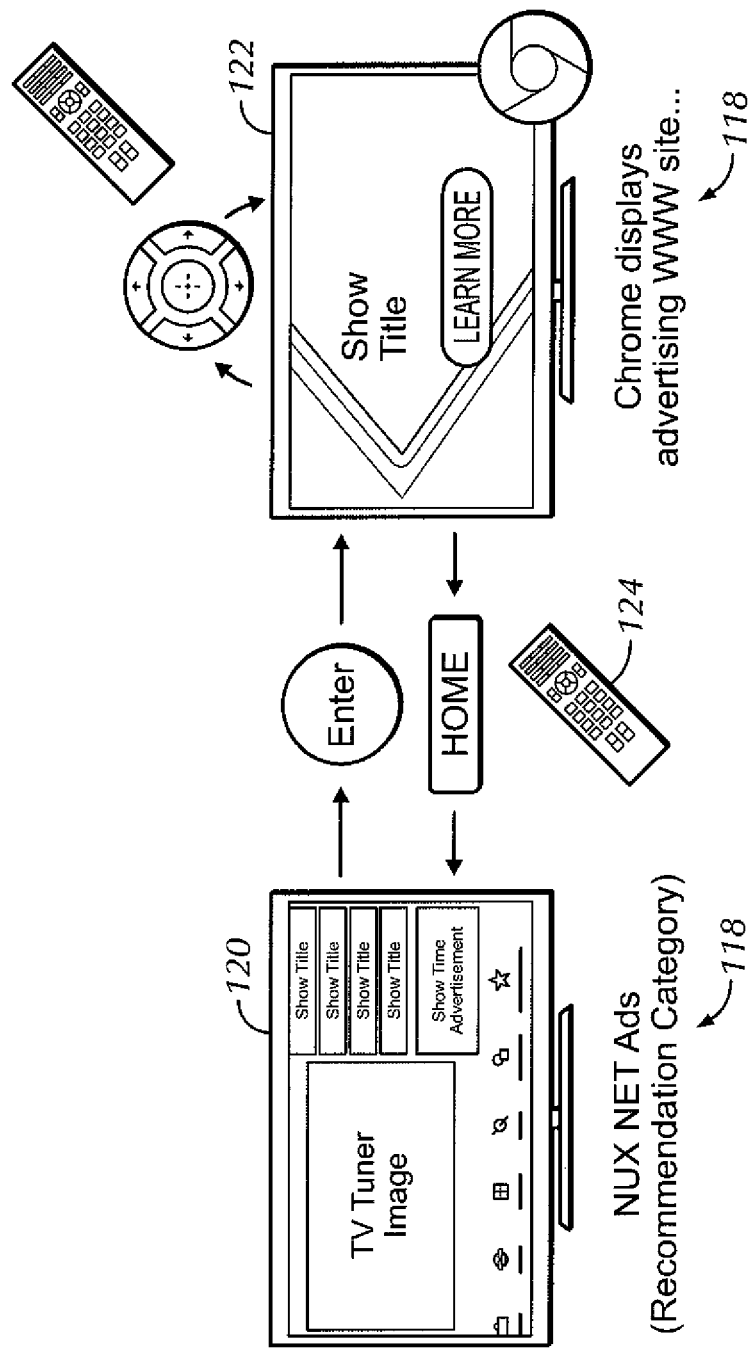

FIG. 5 shows another particular implementation in accordance with present principles. In FIG. 5, Google TV's (GTV) Chrome application is shown as being integrated with the Sony Bravia TV feature Net Ad. The TV 118 first shows screen presentation 120. Presentation 120 shows Bravia Net Ad banners that can be clicked so that ad content may in turn be rendered in Google Chrome, as shown in screen presentation 122. Note that the Bravia TV remote control 124 may be used both to select the ad shown in presentation 120 and to manipulate Google Chrome as shown in presentation 122.

Figure 6:
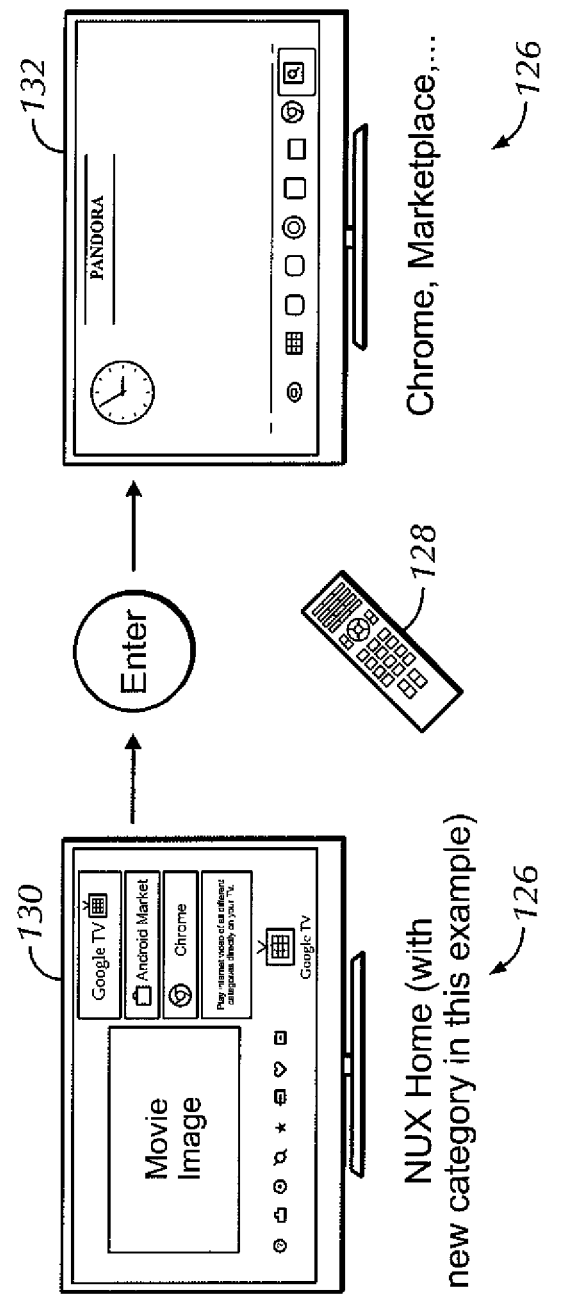

Moving on to FIG. 6, another particular implementation in accordance with present principles is shown. A Sony Bravia TV 126 and associated native Sony Bravia remote control 128 are shown. As shown in screen presentation 130, the Sony Bravia NUX (e.g., shown in the lower left-hand portion of screen presentation 130) shows Google TV-related icons and/or applications on the right-hand side in accordance with present principles. A user may use the Bravia RC 128 to then select and present the Pandora application, as shown in presentation 132. Note that other Google TV icons are shown at the bottom of the screen on presentation 132 but that the Bravia RC 128 may still be used in accordance with present principles to navigate and/or select the Pandora application and/or Google TV icons at the bottom. Also note that as shown in screen presentation 130, a picture-in-picture feature such as that described above in reference to FIG. 4 is shown.

Figure 7:
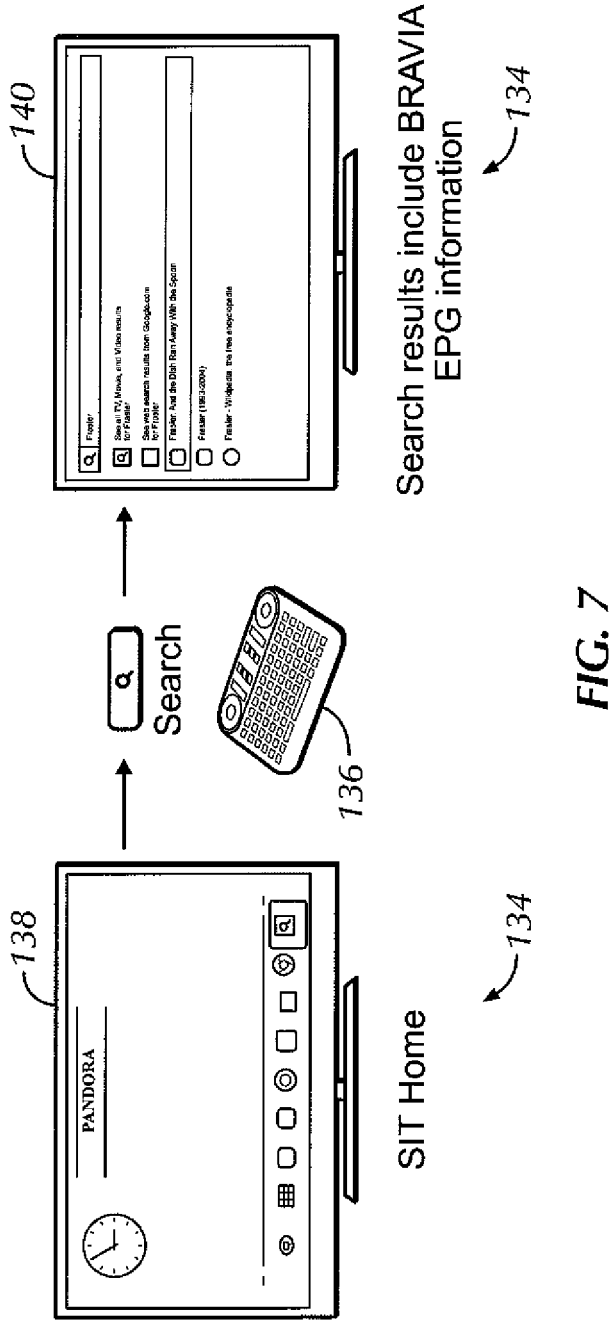

Now in reference to FIG. 7, yet another particular implementation in accordance with present principles is shown. As may be appreciated from FIG. 7, electronic programming guide (EPG) information may be integrated with a Google TV Search feature. Thus, the Sony Bravia TV 134 and a non-native Google TV RC 136 may be used to make Bravia EPG data available to be searched on GTV. Note that the Bravia EPG is a Bravia application, but that the Google TV RC 136 is used in FIG. 7. Also note that while, e.g., a Google TV UI is shown in screen presentation 138, icons including Sony Bravia (e.g., native) icons are shown at the bottom of presentation 138, and that if the highlighted icon were selected, present principles recognize that a Sony Bravia UI would be presented. Regardless, as may be appreciated from screen presentation 140, Sony Bravia EPG content is searched by manipulating the GTV RC 136 such that search results using a Google TV search feature include not only, e.g., search hits from the Internet rendered using the Google TV search feature, but also available programming on the Bravia EPG such that EPG source is included with the Google TV search results.

Figure 8:
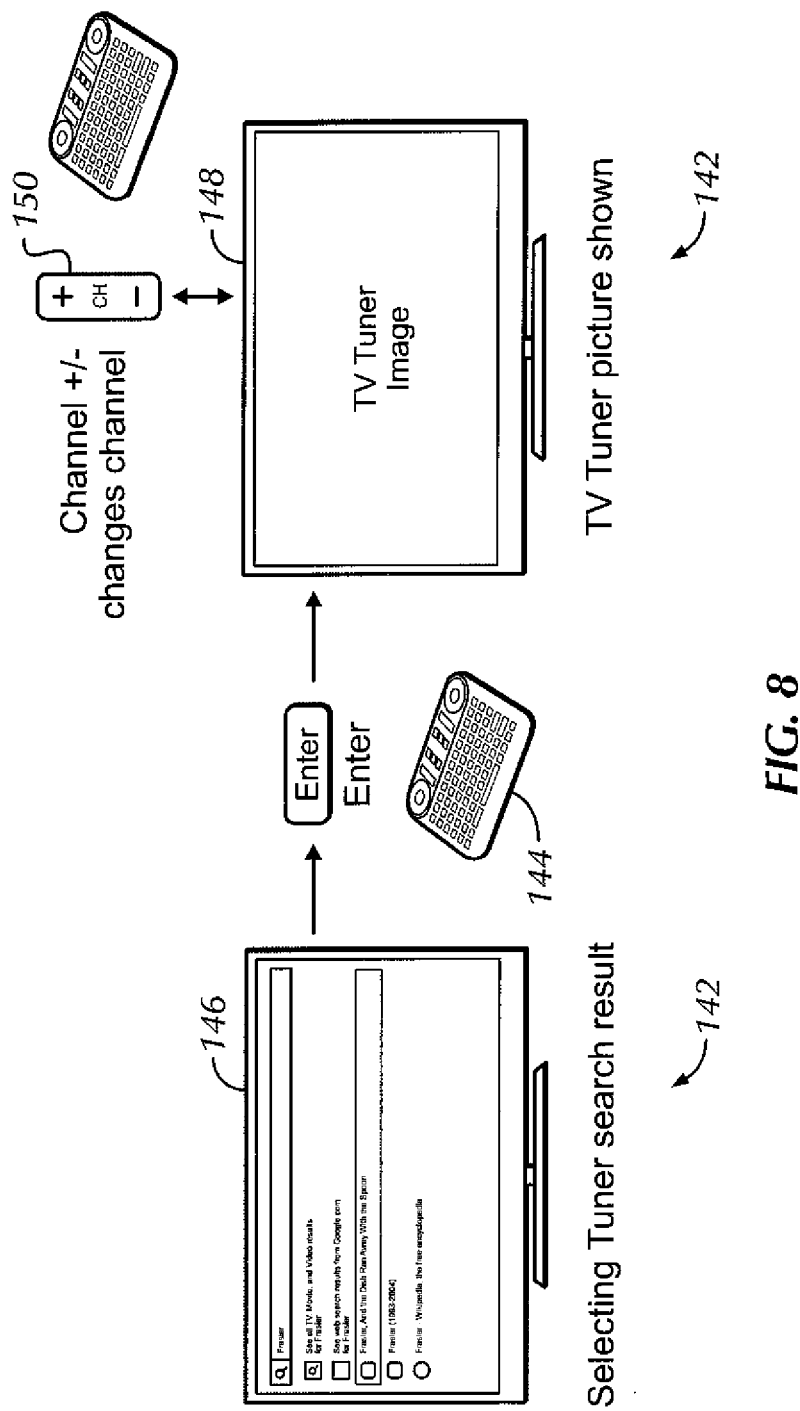

Continuing the present description in reference to FIG. 8, still another particular implementation in accordance with present principles is shown. FIG. 8 shows an instance where a Bravia TV tuner can be controlled from GTV. Thus, a search result such as the one described above in reference to FIG. 7 is shown as screen presentation 146 on Bravia TV 142. The "Frasier" entry gathered from the Bravia EPG information is shown as being highlighted, though it is to be appreciated that Google TV search results are also presented on presentation 146. Regardless, GTV RC 144 may be used to select the "Frasier" Bravia TV link and then the Bravia TV 142 presents it in accordance with present principles, which may be appreciated from screen presentation 148. Thus, in essence, the Bravia TV tuner is controlled using a GTV feature/application and the GTV RC 144 to thereby render content from the Bravia TV tuner. Therefore, for instance, the GTV RC 144, which is understood to have "channel up" and "channel down" keys 150, may be used to change the channel of the Bravia TV tuner using, e.g., the icon/command association parameters disclosed herein.

Figure 9:
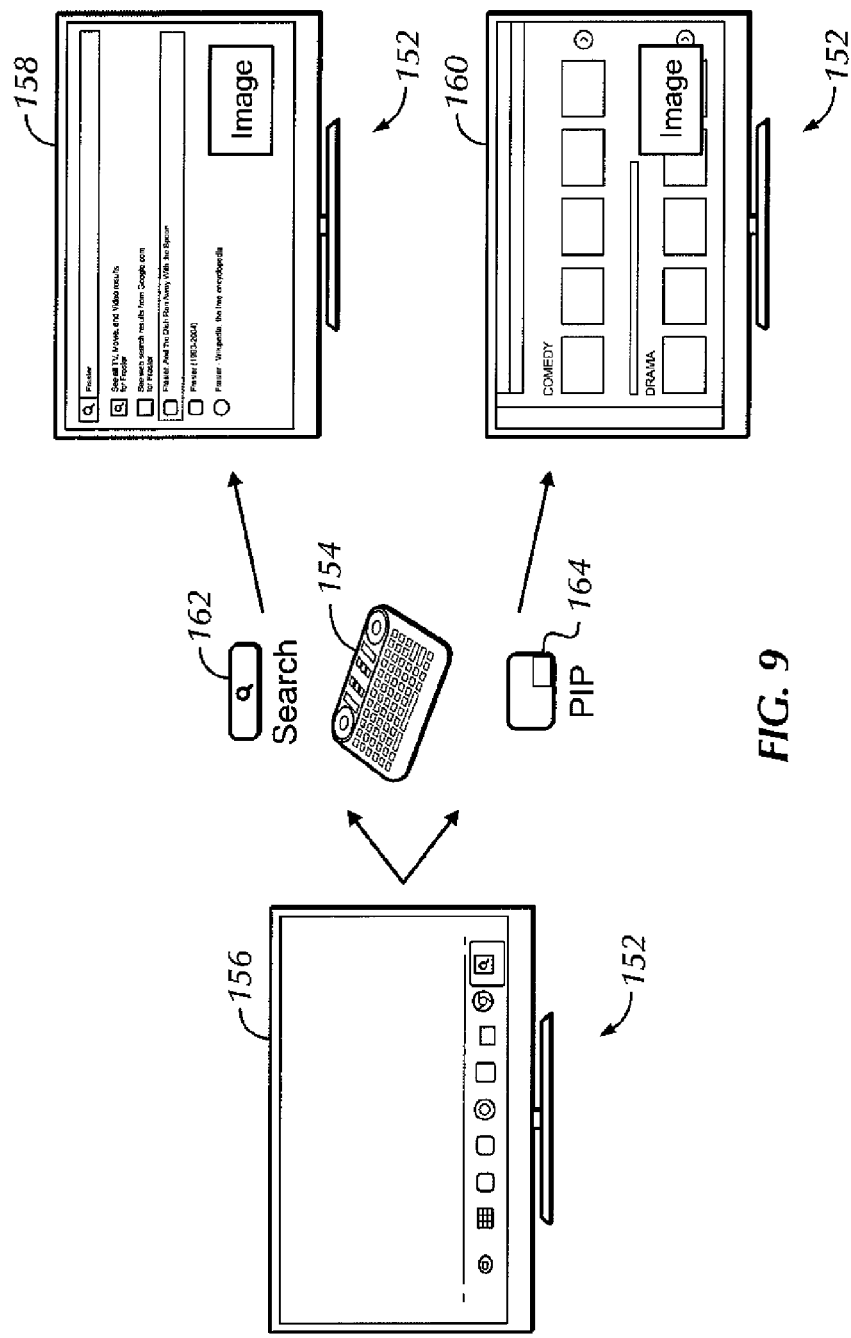

Moving on to FIG. 9, another particular implementation in accordance with present principles is shown. It is to be understood that a Sony Bravia TV 152 may be controlled as shown in FIG. 9 using a GTV RC 154. As shown in screen presentation 156, a program provided to the Bravia TV 152 using a tuner of the Bravia TV is shown. Then, as may be further appreciated from FIG. 9, one of either screen presentation 158 or 160 may be presented on the Bravia TV 152 depending on which particular button on the GTV RC 154 is selected. Thus, note that if the search button 162 on the GTV RC 154 is selected, a combined (e.g., picture-in-picture) GTV search results page such as the ones described above is presented on the Bravia TV 152. However, if a "PIP" button 164 is selected, screen presentation 160 is presented, in which the program shown in presentation 156 is overlaid in, e.g., a picture-in-picture format while other program selectors showing programs available through the Bravia EPG are also shown, it being understood that the program selectors are selectable using either a native Bravia RC or the GTV RC 154.

Note that although FIG. 9 shows the screen presentations 158 and 160 as alternate presentations to be presented on a single Bravia TV (the TV 152), should two display devices (e.g., two TVs) be included within, e.g., a home network, present principles recognize that both of the screen presentations 158 and 160 may be shown simultaneously on different TVs in accordance the disclosure set forth above.

Figure 10:
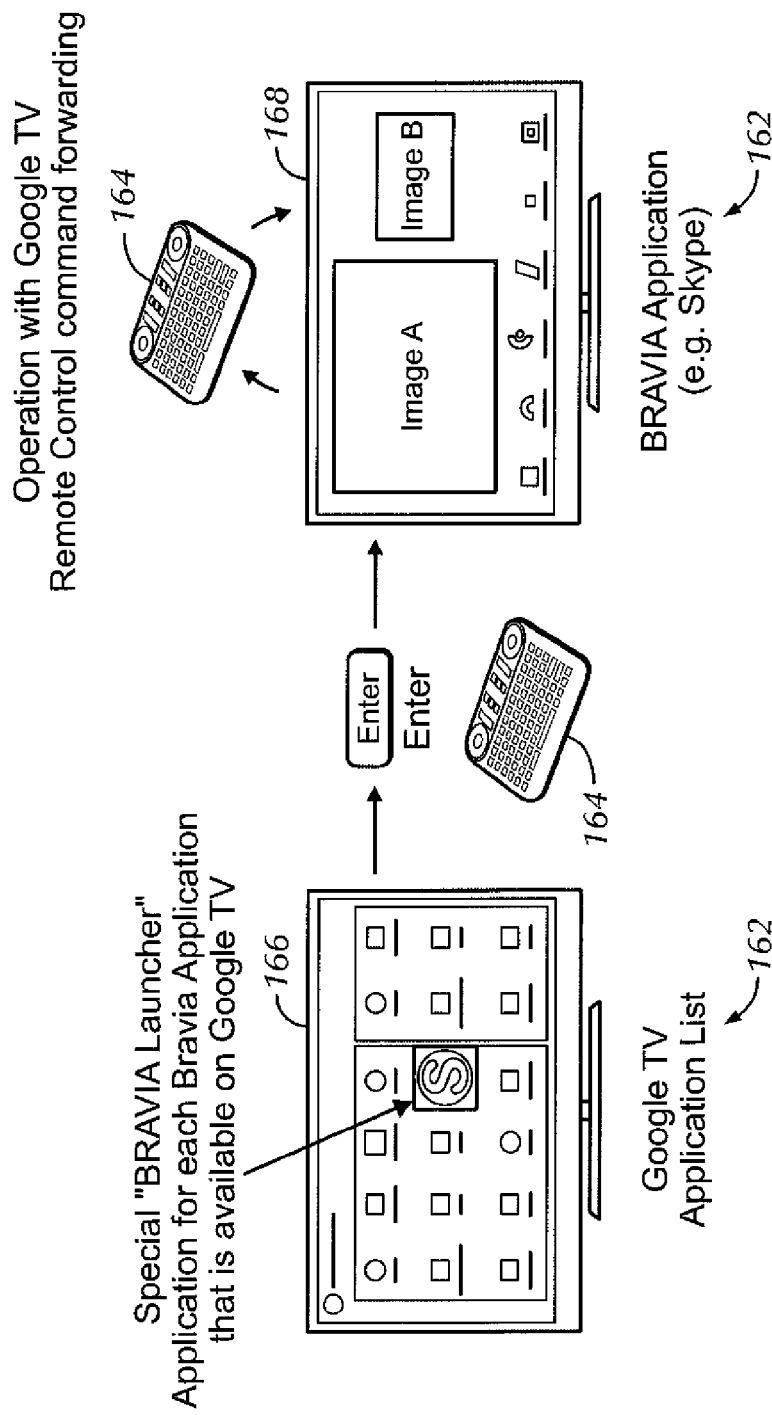

Concluding description of the drawings with reference to FIG. 10, another particular, exemplary implementation in accordance with present principles is shown. FIG. 10 shows an exemplary implementation where native Sony Bravia applications on a Sony Bravia TV 162 such as, e.g., Skype, are controlled using a GTV RC 164. Thus, screen presentation 166 shows a GTV UI that is presented on the Bravia TV 162, where at least one Bravia icon that is active (the Skype icon that is highlighted) is also presented in the arrangement with GTV icons. When the Skype icon is selected using the GTV RC 164, the Skype application may be launched from the Bravia TV 162 and controlled through the GTV RC 164 in accordance with present principles. Accordingly, as shown in screen presentation 168, video conferencing with a two friends is taking place on the Bravia TV 162.

Note that if desired, in some implementations highlighting, hovering over, etc. a single icon, e.g., a Bravia icon may cause plural additional icons to appear and/or be overlaid on top of whatever else is presented on the display at that time. Thus, for instance, referring back to FIG. 10, if a Google TV setup icon were present on the GTV UI shown in presentation 166, and if a cursor hovered over the icon using the GTV RC, e.g., four additional icons related to various particular setup features would appear in an "exploded" view such that they are overlaid (and/or also appear enlarged relative to the other icons) onto the UI while the UI still appears the same in the background, save for the portions now covered by the "exploded" view.

Note that the term "active" used in the context of the Bravia icon noted above means, e.g., that the native component for the application represented by the icon (e.g., where the application resides/is stored) is powered on and hence the application can be controlled in accordance with present principles, that the application associated icon is capable of being presented on the particular display device used, that the application associated with the icon has been properly licensed for use, that the application associated with the icon has up-to-date software, that a proper connection (e.g., HDMI) exists between the two devices (e.g., cables are plugged in, enough bandwidth is available, etc.), while still others as may be appreciated by those in the art.

Additionally, note that although GTV applications have been referenced above, other platforms and applications may be used in accordance with a native display device UI and vice versa, such as, e.g., Apple/iTunes applications.

Also note that with the integrated capabilities described above, users may engage in social networking while watching, e.g., a sporting event in a picture-in-picture format such that they may watch the sporting event and simultaneously, e.g., post comments to Facebook using, e.g., a GTV RC in real time while watching the event. As another exemplary option, a movie can be viewed in a picture-in-picture format while also using, e.g., the Internet or the Internet Movie Database (IMDB) application to look up cast members, plot synopsis, production details, etc.

It is to be understood that the figures and descriptions provided above generally show methods steps in conjunction with the devices disclosed herein.

While the particular INTERNET TV MODULE FOR ENABLING PRESENTATION AND NAVIGATION OF NON-NATIVE USER INTERFACE ON TV HAVING NATIVE USER INTERFACE USING EITHER TV REMOTE CONTROL OR MODULE REMOTE CONTROL is herein shown and described in detail, it is to be understood that the subject matter which is encompassed by the present invention is limited only by the claims.

What is claimed is:

1. A display device comprising:
   non-transitory computer readable storage medium accessible to at least one processor controlling the display to present a native user interface (UI) on the display responsive to commands from a display remote control (RC), the medium having instructions executable by the processor to cause the processor to:
   receive at least icon or application information from an audio visual application module (AVAM);
   present on the native UI at least one selectable AVAM icon according to the information from the AVAM, the AVAM icon associated with an application on the AVAM;
   responsive to selection of the icon from the native UI using the display RC, automatically switch display input source to the AVAM;
   present on the display a non-native UI received from AVAM associated with the application;
   receive input commands from the display RC;

send the input commands to the AVAM; and
responsive to signals from the AVAM that respond to the commands, alter the non-native UI presented on the display, wherein the processor is configured, when accessing the instructions, to not alter the non-native UI presented on the display upon receipt of input commands from the display RC but only pass on input commands from the display RC to the AVAM, subsequently altering the non-native UI presented on the display only in response to signals from the AVAM that respond to the commands.

2. The display device of Claim 1, wherein the processor receives both icon and application information from the AVAM.

3. The display device of claim 1, wherein the connection is HDMI connection.

4. The display device of Claim 1, wherein the connection is an IP connection.

5. The display of claim 4, wherein the connection further includes an IP connection.

6. The display device of claim 3, wherein HDMI input switching is performed by the display device to automatically switch display input source to the AVAM.

7. The display device of Claim 1, wherein the application itself is not stored on the computer readable storage medium of the display device.

8. The display device in Claim 1, wherein at least when the at least one AVAM icon is active, the instructions when executed by the processor configure the processor to juxtapose the AVAM icon in an arrangement including at least one selectable native icon such that both the at least one AVAM icon and the at least one native icon are selectable from the arrangement using the display RC.

9. The display device of Claim 1, wherein plural selectable AVAM icons are presented on the native UI based at least in part on icon and/or application information that is received.

10. The display device of Claim 1, wherein the presentation of the non-native UI on the display is altered in response to an AVAM remote control associated with the AVAM providing input commands directly to the AVAM.

11. A display device comprising;
at least one non-transitory computer readable storage medium accessible to at least one processor controlling the display to present a native user interface (UI) on the display responsive to commands from a display remote control (RC), the medium having instructions executable by the processor to cause the processor to:
receive at least icon or application information from an audio visual application module (AVAM);
present on the native UI at least one selectable AVAM icon according to the information from the AVAM, the AVAM icon associated with an application on the AVAM;
responsive to selection of the icon from the native UI using the display RC, automatically switch display input source to the AVAM;
present on the display a non-native UI received from AVAM associated with the application;
receive input commands from the display RC;
send input commands to the AVAM; and
responsive to signals from the AVAM that respond to the commands, alter the non-native UI presented on the display, wherein the at least icon or application information received from the AVAM includes command association data.

12. The display device of claim 11, wherein upon selection of the icon from the native UI using the display RC, command association data associated with the icon is sent to the AVAM to cause the AVAM to provide the non-native UI.

13. A display device comprising:
at least one non-transitory computer readable storage medium accessible to at least one processor controlling the display to present a native us interface (UI) on the display responsive to commands from a display remote control (RC), the medium having instructions executable by the processor to cause the processor to:
receive at least icon or application information from an audio visual application module (AVAM);
present on the native UI at least one selectable AVAM icon according to the information from the AVAM, the AVAM icon associated with an application on the AVAM;
responsive to election of the icon from the native UI using the display RC, automatically switch display input source to the AVAM;
present on the display a non-native UI received from AVAM associated with the application;
receive input commands from the display RC;
send the input commands to the AVAM; and
responsive to signals from the AVAM that respond to the commands, alter the non-native UI presented on the display, wherein icon and application information is received from the AVAM but not the actual application associated therewith.

14. A display device comprising:
at least one non transitory computer readable storage medium accessible to at least one processor controlling the display to present a native user interface (UI) on the display responsive to commands from a display remote control (RC), the medium having instructions executable by the processor to cause the processor to:
receive at least icon or application information from an audio visual application module AVAM);
present on the native UI at least one selectable AVAM icon according to the information from the AVAM, the AVAM icon associated with an application on the AVAM;
responsive to selection of the icon from the native UI using the display RC, automatically switch display input source to the AVAM;
present on the display a non-native UI received from AVAM associated with the application;
receive input commands from the display RC;
send the input commands to the AVAM; and
responsive to signals from the AVAM that respond to the commands, alter the non-native UI presented on the display, wherein the display device provides at least native icon or application information associated with a selectable native icon to the AVAM to be presented on the non-native UI.

15. The display device of claim 14, wherein the instructions when executed by the processor configure the processor to, responsive to selection of the native icon on the non-native UI using the display remote control, automatically switch the display input source to the display device and presents on the display a native UI associated with the native icon.

16. An audio video application module (AVAM) comprising:
at least one AVAM processor configured to generate an application-based user interface (ABUI);
at least one communication ort establishing communication between the Internet and the AVAM processor;
at least one AV port configured to communicate with a display device having a processor presenting a native UI (NUI) on a display of the display device;

the AVAM processor being configured to:
exchange at least icon or application information with the display device;
based on the information from on received from the display device, add to the ABUI at least one selector each representing respective applications on the display device;
based on user input to an AVAM remote control, send the ABUI to the display device for presentation thereof on the display;
receive at least one command from the AVAM remote control, the at least one command pertaining to at least one application on the display device represented by the at least one selector on the ABUI; and
send the at least one command to the display device for execution of the command by the display device.

17. The AVAM of claim 16, wherein the exchanged information includes at least both icon and application information.

18. The AVAM of claim 16, wherein prior to receiving a command from the AVAM remote control to execute the at least one command, the AVAM receives input from the AVAM remote control to select a selector on the ABUI representing an application on the display device, which the AVAM then forwards to the display device to cause the application on the display device to be presented on the display.

19. The AVAM of claim 18, wherein the application on the display device selected from the ABUI using the AVAM remote control that is presented on the display device is commanded using the AVAM based on input from the AVAM remote control.

20. The AVAM of claim 19, wherein the AVAM does not alter presentation of the application on the display device upon receipt of commands from the AVAM remote control but only passes OD commands from the AVAM remote control to the display device such that presentation of the application on the display is subsequently altered only in response to signals from a processor of the display device that responds to the commands received from the AVAM.

21. The AVAM of claim 16, wherein the port configured to communicate with a display device is an HDMI port and communication with the display device occurs over an HDMI connection.

22. The AVAM of claim 21, wherein the AVAM is further configured to communicate with the display device over an IP connection in addition to the HDMI connection.

23. The AVAM of claim 16, wherein the application on the display device is not stored on the AVAM.

24. The AVAM of claim 16, wherein icon and application information is exchanged with the display device but not the actual application on the display device for control by the AVAM.

25. The AVAM of claim 16, wherein the at least icon or application information that is exchanged includes command association data.

26. The AVAM of claim 25, wherein upon selection of the selector using the AVAM remote control, command association data associated with the selector is sent to the display device to cause the display device to execute the command.

27. The AVAM of claim 16, wherein at least when the at least one selector representing an application on the display device is active, the AVAM juxtaposes the selector representing an application on the display device in an arrangement on the ABUI with at least one AVAM selector such that both the at least one selector representing an application on the display device and the at least one AVAM selector are selectable from the arrangement using the AVAM remote control.

28. The AVAM of Claim 16, Wherein plural selectors representing applications on the display device are presented on the ABUI based at least in part on icon and/or application information that is exchanged.

29. A method comprising:
receiving, at a display device, either or both icon information and application information from and an audio video application module (AVAM);
presenting on a native user interface (UI) of the display device at least one AVAM icon based on the information from the AVAM, the at least one AVAM icon being selectable using a display remote control associated with the display device;
responsive to selection of the icon using the display remote control, automatically switching a display input source to the AVAM;
presenting on the display device a non-native UI and/or an application received from AVAM in response to selection of the icon using the display remote control;
manipulating the non-native UI and/or application using a display remote control associated with the display device;
wherein the display device receives input from the display remote control to alter the non-native UI and/or application and communicates the input to the AVAM such that the AVAM and not the display device is used to alter the non-native UI and/or application based on the input; and
wherein the display remote control is not pre-programmed to directly manipulate the non-native UI and/or application.

* * * * *